(12) United States Patent
Gillespie

(10) Patent No.: US 6,634,833 B2
(45) Date of Patent: Oct. 21, 2003

(54) PNEUMATIC CONVEYING APPARATUS

(75) Inventor: Wayland E. Gillespie, Upland, CA (US)

(73) Assignee: Pneumatic Conveying, Inc., Ontario, CA (US)

( * ) Notice: Subject to any disclaimer, the term of this patent is extended or adjusted under 35 U.S.C. 154(b) by 28 days.

(21) Appl. No.: 09/998,752

(22) Filed: Nov. 30, 2001

(65) Prior Publication Data
US 2003/0103815 A1 Jun. 5, 2003

(51) Int. Cl.[7] ............................................. B65G 51/20
(52) U.S. Cl. ..................................... 406/84; 406/168
(58) Field of Search ........................... 406/15, 83, 84, 406/168

(56) References Cited

U.S. PATENT DOCUMENTS

| | | | | |
|---|---|---|---|---|
| 3,336,085 A | * | 8/1967 | Strydom ...................... 406/33 |
| 4,087,134 A | * | 5/1978 | Jordan et al. ................ 406/146 |
| 4,178,662 A | * | 12/1979 | Borodin ....................... 445/67 |
| 4,573,830 A | * | 3/1986 | Richardson et al. .......... 406/84 |
| 4,984,939 A | * | 1/1991 | Foreman et al. .............. 406/84 |
| 6,210,080 B1 | * | 4/2001 | Haul et al. .................... 406/13 |
| 6,322,295 B1 | * | 11/2001 | Gabriele ....................... 406/84 |

OTHER PUBLICATIONS

Pneuc–Con Pneumatic Conveying, Inc. brochure.

* cited by examiner

Primary Examiner—Joseph A. Dillon
(74) Attorney, Agent, or Firm—Stetina Brunda Garred & Brucker

(57) ABSTRACT

A pneumatic conveying apparatus, having a conveyor line path installed with a first valve and a second valve. An article is conveyed through the conveyor line path. The first and second valves are both open to a vacuum source to provide a sucking force to the article, so as to initiate conveying the article. After a flow of the article through the whole conveyor line path is established, the second valve is closed to form an air cushion at the terminal end of the conveyor line path. The terminal velocity of the article is thus reduced without causing any damage or breakage.

16 Claims, 3 Drawing Sheets

PNEUMATIC CONVEYING APPARATUS

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to conveying apparatus, and more particularly to a pneumatic conveying apparatus that rapidly conveys products while safely reducing the terminal velocity of the product to avoid damaging the same.

Mechanical conveyors have been commonly used for transporting articles. However, such prior art mechanical conveyers are costly, possess substantial product contamination concerns and often time damage fragile product such as cereals and/or coffee beans.

To address the problems of mechanical conveyors, pneumatic conveyors have heretofor been developed. In conventional pneumatic conveyors, product is conveyed in a pipe or conduit via air, i.e., vacuum. Articles to be conveyed in such pneumatic systems require a sufficient initial velocity to prevent product dropout during conveyance; yet, the terminal velocity of the articles must be reduced to prevent product damage and degradation.

The prior art mechanisms for reducing the terminal velocity of the articles under pneumatic conveyance typically comprise using a cyclone or alternatively gradually increasing conduit/line size through the conveyance path. In a cyclone, mechanical frictional deceleration often causes the article to break and become damaged. By gradually increasing the line size, the articles often time drop out causing the conveyor line to plug.

As such, there exists a substantial need in the art for an improved pneumatic conveyor system that safely conveys fragile product without damage and eliminate product drop out during transport.

SUMMARY OF THE INVENTION

To obtain a fluent conveyance of articles without breakage or damage, the present invention provides a pneumatic conveying apparatus having a unique terminal velocity dissipater. Instead of using the prior art mechanical decelerating methods such as a cyclone or gradually increasing the line size for the articles under conveyance, the present invention utilizes a pressure gradient (dead) air cushion formed at the terminal end of the conveyor. Traveling through the air cushion, the velocity of the articles is rapidly reduced without substantially physical impact or friction thereby significantly reducing damage or breakage of the articles being conveyed.

In the preferred embodiment of the invention, the pneumatic conveying apparatus comprises two valves installed along the conveyor line path for the articles to be conveyed. Both valves are initially opened to a pressure source to allow a high initial force to be applied to the product to initiate flow and ensure against product dropout thereby establishing a steady product flow from the entrance to the exit of the conveyor line path.

Subsequently, a second one of the valves is closed, or supplied with a reduced pressure or a pressure in an inverse direction, to the initial pressure to establish a dead air space at a terminal end of the conveyor line path while maintaining sufficient inertia and velocity to continue product flow toward the terminal end of the conveyor line path. The articles flowing from the open valve to the terminal end of the conveyor line path experience a draw back pressure gradient due to the vacuum supplied by the open valve; that is, a (dead) air cushion formed between the open valve and the exit of the line path to cause a controlled and dampened deceleration of the articles at the terminal end of the line path.

In the above embodiment, as the articles are not decelerated by any frictional force or physical contact, damage or breakage of the articles is prevented with articles conveyed with velocities of about 8000 ft/min to about 9000 ft/min in a conveyor line path having a length of about 200 ft to about 300 ft.

In another embodiment of the present invention, only one valve is installed on the conveyor line path. By supplying a pressure to the conveyor line path via the valve, the product is drawn into the conveyor line path and accelerated to a required velocity. After a steady state flow of the product is established, the pressure is adjusted to a magnitude to form a gradient pressure at a terminal end of the conveyor line path. The terminal velocity of the product is thus retarded by the gradient pressure while a sufficient internia and velocity is maintained to continue product flow towards the terminal end.

A container is further provided to connect with the exit of the conveyor line path. The container is so designed that the article entering therein is directed tangentially about an inside diameter thereof. Preferably, the flow velocity of the articles is monitored to determine the timing for closing the second one of the valves adjacent the terminal end of the conveyor line path, to ensure that the product flows within the conveyor at sufficient velocity to prevent product dropout yet avoid product damage heretofore occurring at the terminal end of the conduit line.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
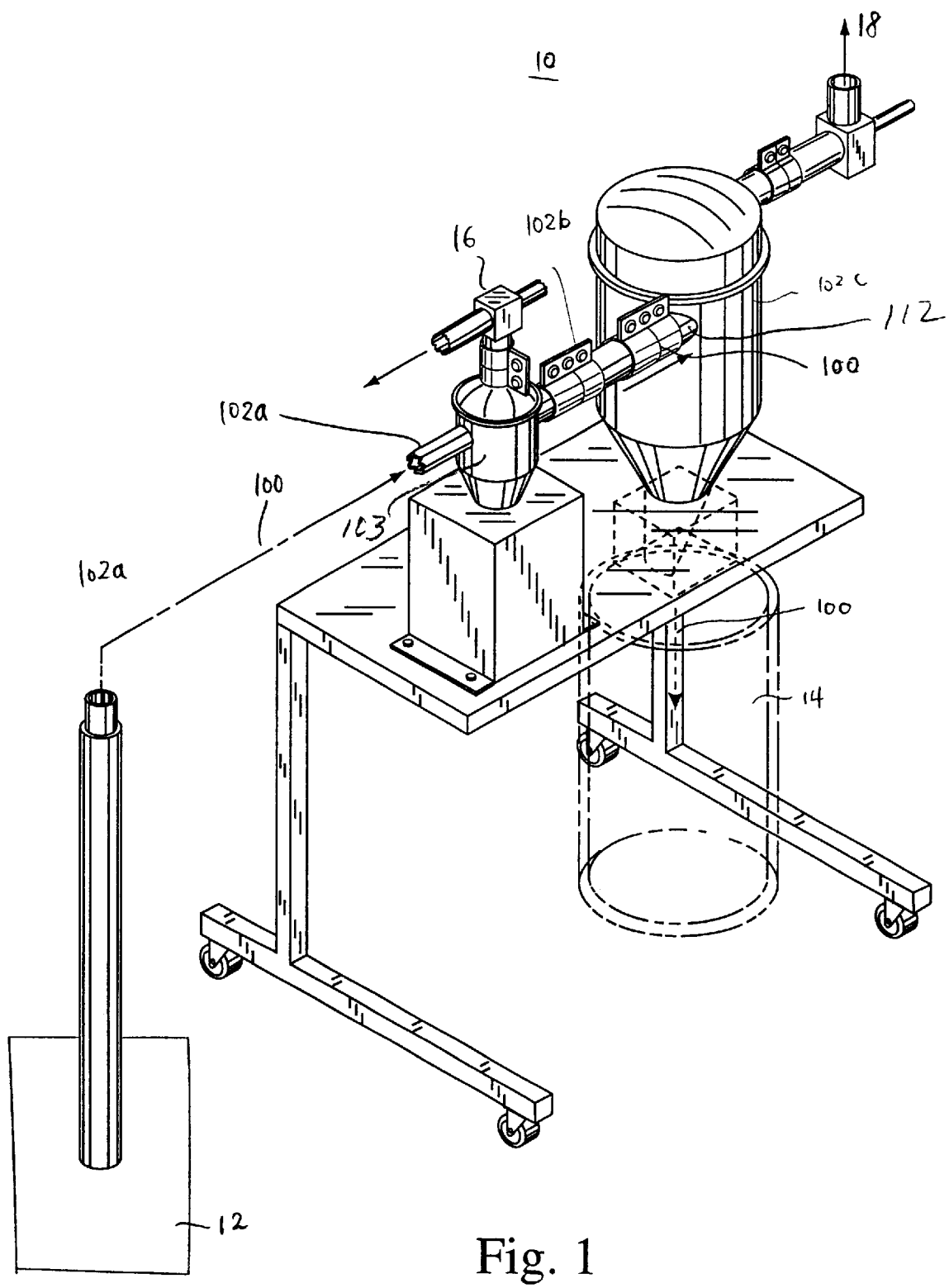
FIG. 1 shows the pneumatic conveying apparatus according to the invention.

FIG. 1 shows the pneumatic conveying apparatus 10 of the present invention, which conveys articles/product 200 (FIG. 2) from a source container 12 to a destination container 14 through a conveyor line path 100. Along the conveyor line path 100 of the pneumatic conveying apparatus 10, a pair of valves 16 and 18 are installed which are preferably connected to a suitable common vacuum source indicated schematically by the arrows in FIG. 1. The conveyor line path 100 comprises a conduit 102a, a conduit 102b and a vessel 102c. The conduit 102a connects between the source container 12 and the valve 16. The conduit 102b extends from the valve 16 to a top portion of the vessel 102c. A bottom portion of the vessel 102c connects to the destination container 14.

Figure 2:
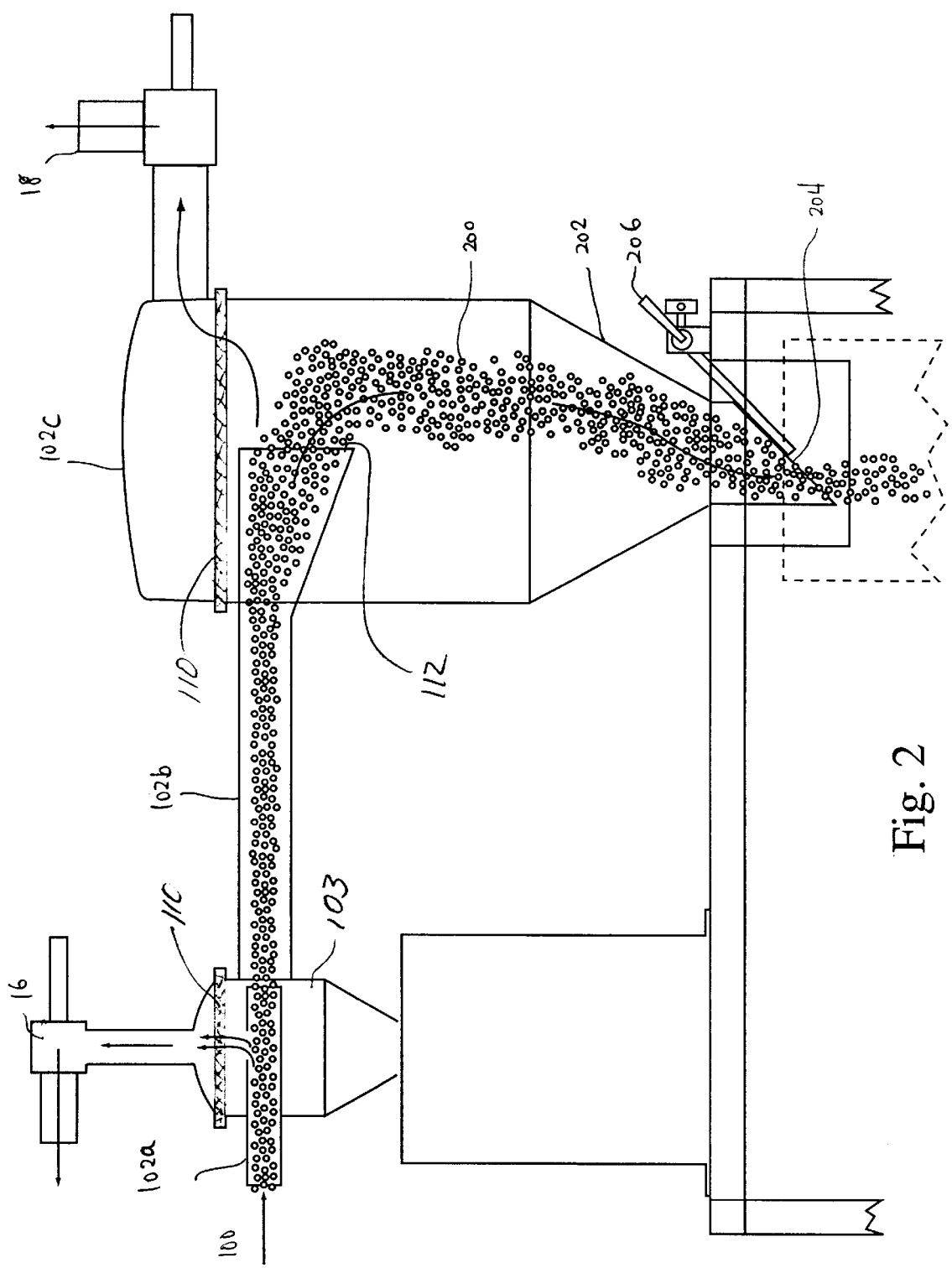
FIG. 2 shows flow of the articles under conveyance.

As shown, the valves 16 and 18 are preferably disposed upon the conveyor path 100, with valve 16 being located upstream of the terminal end of the conveyor path while valve 18 is disposed just downline of the terminal end of the conveyor path. Valve 18 is preferably disposed adjacent the upper end of the vessel 102c, while valve 16 is preferably installed adjacent the upper portion of vessel 103. As best shown in FIG. 2, a pair of conventional filters 110 are provided in the upper portion of the vessels 102c and 103 which allow air flow through the filters 110 and valves 16 and 18 while preventing product or article flow there across. As such, upon opening of the valves 16 and 18 to the vacuum source, the articles conveyed within the conveyor line 100 and its portions 102a, 102b and 102c are exposed to vacuum pressure through the valves 16 and 18 but are prevented from traveling into the vacuum source via the filters 110.

The exit container 102c is preferably designed with a configuration such that the product entering thereto is directed tangentially about the inside diameter thereof. Such design includes a hopper configuration with the inlet opening 112 oriented tangentially with the inside diameter, for example. It will be appreciated to the people of ordinary skill in the art that a container with other configuration resulting in the same effect is also applicable for the exit container 102c. The lower portion of the vessel 102c preferably includes an articulating gate 206 which may be selectively opened or closed, as desired, to allow product 200 contained within the vessel 102c to be selectively dropped via gravity force into the destination vessel 14.

With the structure defined, the operation of the improved pneumatic conveyor system 10 of the present invention may be described. To initiate article/product flow within the conveyor line 100 from the source container 12 to the destination container 14, both valves 16 and 18 are initially opened such that a maximum vacuum source is provided within the interior of the entire conduit line 100. Upon encountering this large vacuum source, product is rapidly accelerated within the conveyor line 102a from the source container 12 and transported within the interior of the conduit line 102a, 102b and into the exit container 102c. During this initial product transport, sufficient vacuum is maintained within the entire length of the conduit line 100, such that articles within the line have sufficient velocity to maintain a generally steady state flow and thereby avoid product dropout occurring within the conduit line 100.

Figure 3:
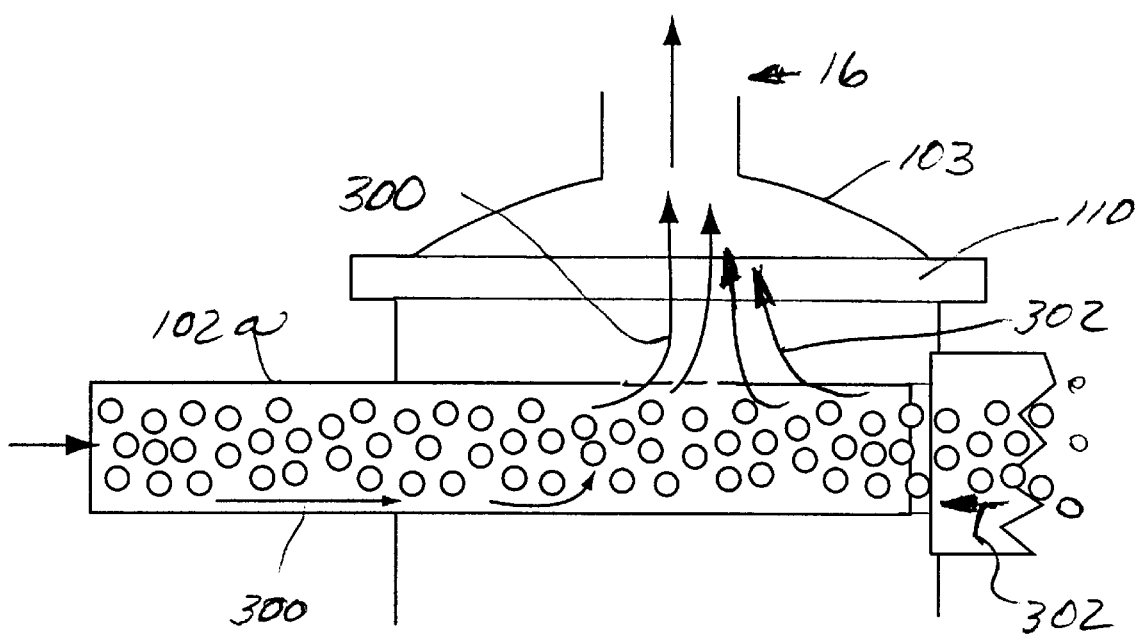
FIG. 3 shows the back flow of the articles under conveyance caused by closing one of the valves in the pneumatic conveying apparatus.

After obtaining this generally steady state initial flow, the downline valve 18 is closed such that the only vacuum source transporting articles within the conduit line 100 is applied through the upstream valve 16. As best shown in FIG. 3, the closing of the valve 18 while maintaining the valve 16 opened, causes upstream air 300 to be pulled through the conveyor section 102a, while downstream air 302 existing within conduits section 102b and the interior of the vessel 102c to additionally be drawn back toward the valve 16 as indicated by the arrows in FIG. 3. As previously mentioned, due to filter element 110, upstream air 300 and downstream air 302 pass through the filter 110 while product contained remains within the conveyor system. By drawing back the downline air flow 302 from the interior of conduit 102b and vessel 102c, a pressure gradient exists on opposite side of the valve 16 with the conveyor line forming a dead air space which is established within the interior of the container 102c and conveyor 102b. The pressure gradient/dead air space applies a pneumatic deceleration force or air cushion which rapidly decelerates the articles once they have passed the valve 16. Preferably, by proper sizing of the valve 16 along with the diameter of the conveyor section 102b and length thereof, the terminal velocity of particles entering into the vessel 102c can be maintained within suitable limits such that the exit velocity of particles into the container 102c is substantially zero and the same can fall via gravity force into the lower hopper portion 202 of the vessel 102c. Additionally, those skilled in the art will recognize that the vacuum source applied to the conveyor section 102a through valve 16 is preferably adjusted such that sufficient vacuum is applied to the articles to prevent product dropout.

In the above embodiment, the articles 200 are conveyed with a sufficiently high flow velocity, yet, with a sufficiently low terminal velocity to avoid damage or breakage. The structure allows conveying articles through a conveyor line path of about 200 ft to about 300 ft with a velocity of about 8000 ft/min to about 9000 ft/min. The velocity of the conveyance can be monitored by many ways, for example, by installing a flow meter or visual observation or the article removal rate from the source container, or accumulation rate in the destination container.

Further, the conduits 102a and 102b can be made from a single conduit, or by assembling several parts together. The magnitude of vacuum provided by the valve 16 and the valve 18 can be adjusted individually as required.

The valves 16 and 18 in the above embodiment can also be connected to a pressure source or a pressure pump other than a vacuum source. By controlling the pressure supplied to the convey line path 100 via the valves 16 and 18, the same objective can be achieved. For example, a pressure is applied to both valves 16 and 18 to accelerate the product and draw the product into the conveyor line path 100 initially. Again, the initial pressure is sufficiently high to avoid any dropout of the product. After a steady flow of the product is obtained, the pressure applied to the valve 18 is reduced, terminated or supplied in an inverse direction, such that a dead air space is formed in the terminal end of the conveyor line path 100. Consequently, the terminal velocity of the product is reduced, while a sufficient inertia and velocity is maintained for the product to flow from the source container 12 to the terminal end. In addition, the pressure supplied via the valve 16 can also be adjusted while the pressure supplied via the valve 18 is altered.

Alternatively, only one valve is installed on the conveyor line path instead of incorporating two valves. An initial pressure is supplied to the conveyor line path via the valve until a steady state flow of the product is obtained. The initial pressure is sufficiently to avoid any dropout of the product. While reaching a steady state flow of the product, the pressure supplied via the valve is adjusted to a magnitude allowing a pressure gradient formed in a terminal end of the conveyor line path.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. A pneumatic conveying apparatus for pneumatic conveying a product, comprising:

conduit, through which the product is conveyed;

first valve installed on the conduit, the first valve being connected to a vacuum source and operative to initiate and maintain a flow of the product through the conduit; and second valve installed downstream to the first valve, the second valve being connected to the vacuum source and adjustable to decelerate the flow of the product to a substantially zero terminal velocity as the product exits the conduit.

2. The pneumatic conveying apparatus of claim 1, wherein the first and the second valves are open to the vacuum source to initiate the flow of the product with a velocity sufficiently high to prevent the product from free falling within the conduit.

3. The penmatic conveying apparatus of claim 1, wherein the product comprises a plurality of fragile particles.

4. The pneumatic conveying apparatus of claim 1, wherein the conduit between the first valve and second valve is wider than that before the first valve.

5. The pneumatic conveying apparatus of claim 1, further comprising a vessel connected to an exit of the conduit, wherein the vessel has a configuration allowing the product to be tangentially directed while entering thereto.

6. A conveying apparatus, comprising:
   a first conduit, with a first end connected to a source containing a product to be conveyed;
   a second conduit wider than the first conduit, the second conduit having a first end connected to a second end of the first conduit;
   a first valve, installed at a joint between the first and second conduits and connected to a pressure source;
   a vessel, having a top end connected to a second end of the second conduit and a bottom end connected to a destination for receiving the product; and
   a second valve, installed on a top portion the vessel and connected to the pressure source, the second valve being adjustable to control a pressure supplied to the second end of the second conduit.

7. The pneumatic conveying apparatus of claim 6, wherein the first valve and the second valve are open to the pressure source to initiate a product flow with a velocity sufficiently high to prevent the product from falling out within the first and second conduits, and the second valve is closed when a steady state product flow is established.

8. The pneumatic conveying apparatus of claim 7, wherein a dead air cushion is formed at the second end of the second conduit when the second valve is closed.

9. The pneumatic conveying apparatus of claim 6, wherein the product comprises a plurality of fragile particles.

10. The pneumatic conveying apparatus of claim 6, wherein the vessel further comprises a hopper at the bottom end thereof.

11. A method for pneumatically conveying a product through a conveying apparatus, comprising:
    applying a suction force to initiate a flow of the product through the conveying apparatus with an initial velocity high enough to prevent the product from falling out; and
    forming a pressure gradient at a terminal end before an exit of the conveying apparatus to decelerate the product to a terminal velocity.

12. The method of claim 11, wherein the step of forming the pressure gradient comprises partially reducing the suction force.

13. The method of claim 11, wherein the step of applying a vacuum force comprises installing two valves open to a vacuum source.

14. The method of claim 1, wherein the step of forming the pressure gradient at the terminal end before the exit comprises keeping one of the valves open to the vacuum source, and closing the other one valve located downstream to the valve open to the vacuum.

15. The method of claim 11, wherein the step of forming the pressure gradient decelerates the product to a terminal velocity.

16. The method of claim 15, wherein the terminal velocity is substantially zero.

* * * * *